(12) United States Patent
Kratochvil

(10) Patent No.: US 11,245,829 B2
(45) Date of Patent: Feb. 8, 2022

(54) COMMUNICATION DEVICE OF A MOTOR VEHICLE, A MOTOR VEHICLE LIGHTING DEVICE FOR THE COMMUNICATION DEVICE OF A MOTOR VEHICLE AND A CAR2CAR OR CAR2X COMMUNICATION METHOD FOR A MOTOR VEHICLE

(71) Applicant: Varroc Lighting Systems, s.r.o., Senov u Noveho Jicina (CZ)

(72) Inventor: Jan Kratochvil, Trebic (CZ)

(73) Assignee: Varroc Lighting Systems, S.R.O., Senov u Noveho Jicina (CZ)

(*) Notice: Subject to any disclaimer, the term of this patent is extended or adjusted under 35 U.S.C. 154(b) by 0 days.

(21) Appl. No.: 16/367,977

(22) Filed: Mar. 28, 2019

(65) Prior Publication Data

US 2019/0306396 A1    Oct. 3, 2019

(30) Foreign Application Priority Data

Mar. 29, 2018   (CZ) .................................. CZ2018-156

(51) Int. Cl.
*H04W 4/40* (2018.01)
*H04N 5/225* (2006.01)
(Continued)

(52) U.S. Cl.
CPC .......... *H04N 5/2258* (2013.01); *F21S 41/675* (2018.01); *F21S 43/30* (2018.01);
(Continued)

(58) Field of Classification Search
CPC .... H04N 7/181; H04N 5/2258; H04N 5/2254; H04W 4/40; F21S 41/675; F21S 43/30;
(Continued)

(56) References Cited

U.S. PATENT DOCUMENTS 8,629,768 B2 * 1/2014 Bos ........................ H04N 7/183
340/461
10,300,873 B2   5/2019 Venkat et al.
(Continued)

FOREIGN PATENT DOCUMENTS

CN          106043104       10/2016
DE    10 2012 011 994 A1   12/2013
(Continued)

OTHER PUBLICATIONS

Search Report for CZ Application No. PV 2018-156, dated Mar. 15, 2019.

*Primary Examiner* — Jeff A Burke
*Assistant Examiner* — Sihar A Karwan
(74) *Attorney, Agent, or Firm* — JK Intellectual Property Law, PA

(57) ABSTRACT

The invention relates to a communication device of a motor vehicle (X), comprising an imaging camera (2) of a scene image (11) connected to control electronics (1), to which a DMD (7) is connected, the mirror surface (70) of which is preceded by optics (3), whereby the mirror surface (70) is functionally associated with a secondary imaging unit (5) having an optical sensor (50) adapted to receive a selected part of the light (32) from the scene image (11) reflected by a selected part of the mirrors of the mirror surface (70) of the DMD (7). The DMD (7) is part of the vehicle lighting device (0) in which an illumination unit (4) is arranged towards the mirror surface (70) of the DMD (7), the illumination unit (4) being adapted to illuminate controllably at least a part of the mirror surface (70) of the DMD (7) and to emit the desired light output beam (30).
In addition, the invention relates to a lighting device (0) of a motor vehicle for a communication device of a motor vehicle and a car2car or car2X communication method for a motor vehicle.

16 Claims, 5 Drawing Sheets

(51) Int. Cl.
*H04B 10/112* (2013.01)
*F21S 41/675* (2018.01)
*F21S 43/30* (2018.01)
*B60Q 1/30* (2006.01)
*B60R 1/12* (2006.01)
*B60R 1/04* (2006.01)
*B60Q 1/04* (2006.01)

(52) U.S. Cl.
CPC ....... *H04B 10/1129* (2013.01); *H04N 5/2254* (2013.01); *H04W 4/40* (2018.02); *B60Q 1/04* (2013.01); *B60Q 1/30* (2013.01); *B60R 1/04* (2013.01); *B60R 1/12* (2013.01); *B60R 2001/1253* (2013.01)

(58) Field of Classification Search
CPC ..... B60R 1/12; B60R 2001/1253; B60R 1/04; H04B 10/116; H04B 10/1123; H04B 10/40; H04B 10/1129; B60Q 1/26; B60Q 1/30; B60Q 1/04; G08G 1/09; G08G 1/096791

USPC .......................................................... 348/148
See application file for complete search history.

(56) References Cited

U.S. PATENT DOCUMENTS

| | | |
|---|---|---|
| 10,415,786 B2 | 9/2019 | Ahn et al. |
| 2010/0020170 A1* | 1/2010 | Higgins-Luthman ........................ B60Q 1/1423 348/135 |
| 2011/0098877 A1 | 4/2011 | Stählin et al. |
| 2012/0127747 A1 | 5/2012 | Ahn et al. |
| 2018/0009374 A1* | 1/2018 | Kim .................... G03B 21/2013 |
| 2018/0114566 A1 | 4/2018 | Aoyama et al. |
| 2018/0356062 A1 | 12/2018 | Mayer et al. |

FOREIGN PATENT DOCUMENTS

| | | |
|---|---|---|
| WO | WO 2014204794 A1 | 12/2014 |
| WO | WO 2015033764 | 3/2015 |
| WO | WO 2017104666 | 6/2017 |
| WO | WO 2017143371 | 8/2017 |

* cited by examiner

COMMUNICATION DEVICE OF A MOTOR VEHICLE, A MOTOR VEHICLE LIGHTING DEVICE FOR THE COMMUNICATION DEVICE OF A MOTOR VEHICLE AND A CAR2CAR OR CAR2X COMMUNICATION METHOD FOR A MOTOR VEHICLE

CROSS-REFERENCE TO RELATED APPLICATIONS

This application claims benefit to Czech Patent Application Number PV 2018-156, filed Mar. 29, 2018, which is incorporated by reference herein in its entirety.

TECHNICAL FIELD

The invention relates to a communication device of a motor vehicle, comprising a scene imaging camera connected to control electronics, to which a DMD (digital micromirror device) is further connected, whose mirror surface is preceded with optics, whereby the mirror surface is associated with a secondary imaging unit having an optical sensor adapted to receive a selected part of the light from a scene image reflected by a selected part of the mirrors of the DMD mirror surface.

The invention also relates to a motor vehicle lighting device for a communication device of a motor vehicle, which comprises a DMD with a mirror surface which is functionally associated with an illumination unit and output optics of the desired light output beam.

In addition, the invention relates to a car2car or car2X communication method of a motor vehicle in which a scene image of the vehicle's surroundings is monitored by a vehicle communication system, areas of occurrence of a car2car and/or car2X signal are detected in the scene image, whereupon the image of only those areas by which the transmitted car2car or car2X signal is detected and subsequently decoded by the control electronics is reflected by selected mirrors of the mirror surface of the DMD to the optical sensor of the secondary imaging unit.

BACKGROUND

WO 2014204794 A1, US 20140104077 A1, DE 102012011994 A1, US 20110098877 A1, CN 106043104 A and others disclose numerous solutions which allow communication between vehicles by a Car2Car signal or a Car2X signal. A common drawback of these solutions is the fact that the signal range and its quality is limited, since the Car2Car signal or car2X signal detection means used do not allow sufficiently rapid detection and adequate accuracy of detection of the light function emitted by high frequency through the vehicle lighting device. The phototransistors or photodiodes used are not sufficiently sensitive and have no spatial detection to ensure the required degree of detection with sufficient accuracy.

CZ 2017-160 discloses a communication device of a motor vehicle which uses a Car2Car or car2X light signal transmitted either by other road users or transmitted by the infrastructure, wherein the received signals are recorded with sufficient accuracy, speed and quality, and subsequently the image signals and images are processed into data information and transmitted to the electrical or electronic equipment of the vehicle for further use. This motor vehicle communication device comprises primary imaging optics for producing an input image from a received scene image which may contain the light car2car signal and/or light car2X signal including traffic-relevant information. The device further comprises a DMD mirror array for receiving the input image and then transmitting it through secondary imaging optics to a primary optical sensor which is adapted to convert the thus received optical input image into an electrical signal and to send it to control electronics. The control electronics is adapted to process the electrical signal to determine whether and at which locations of the input image there are sources of the car2car signal or car2X signal. If such a location or such locations with a source of the car2car signal or car2X signal is/are found in a given input image, the control electronics recalculates the position of the pixels corresponding to those locations on the primary optical sensor into the positions of each mirror in the DMD mirror array, and then sends a control signal to the DMD mirror array by which the position of the respective mirrors in the DMD mirror array is changed. Thereby, the input image of the above-mentioned locations with a car2car or car2X signal source is redirected via an optical member to a secondary optical sensor which is adapted to convert the optical signal into an electrical signal which is subsequently evaluated by the control electronics and the information encoded in the captured car2car or car2X signal is decoded. The control electronics is further connected to the electronic equipment of the vehicle to which it transmits decoded information from the primary and/or secondary optical sensor. The position of each of the mirrors of the DMD mirror array is controlled by the control electronics by the control signal so that, after redirecting the input image to the secondary optical sensor, the position of the mirrors can be set again to send the next (following) input image to the primary optical sensor.

The disadvantage of this arrangement is the fact that the system requires its own elements, such as a DMD, a video camera, etc., which makes the entire system more expensive when fitted into the vehicle. A certain limit is also shown in the field of reliability of the car2car or car2X signal recognition and subsequent detection of the car2car or car2X signal.

The aim of the invention is to eliminate or at least minimize the disadvantages of the background art.

SUMMARY

The aim of the invention is achieved by a communication device of a motor vehicle, whose principle consists in that a DMD is a part of a vehicle lighting device, in which an illumination unit is arranged towards a DMD mirror surface, the illumination unit being adapted to illuminate at least a part of the DMD mirror surface in a controlled manner and to emit the desired light output beam.

The principle of the motor vehicle lighting device consists in that a secondary imaging unit with an optical sensor adapted to receive a selected part of the light from a scene image reflected by a selected part of the mirrors of the DMD mirror surface is functionally associated with the DMD mirror surface.

This invention enables to simplify considerably the car2car and/or car2X communication system of a vehicle by utilizing the existing vehicle parts and reducing the number of proprietary parts. Furthermore, the system allows simple and efficient detection of car2car and/or car2X signals, and, especially when using multiple cameras and multiple secondary imaging units, it also allows the detection of car2car and/or car2X signals, both in front of the vehicle and behind the vehicle, as well as next to the vehicle. In addition, the system allows integration with other road safety and security systems.

DETAILED DESCRIPTION

Figure 1:
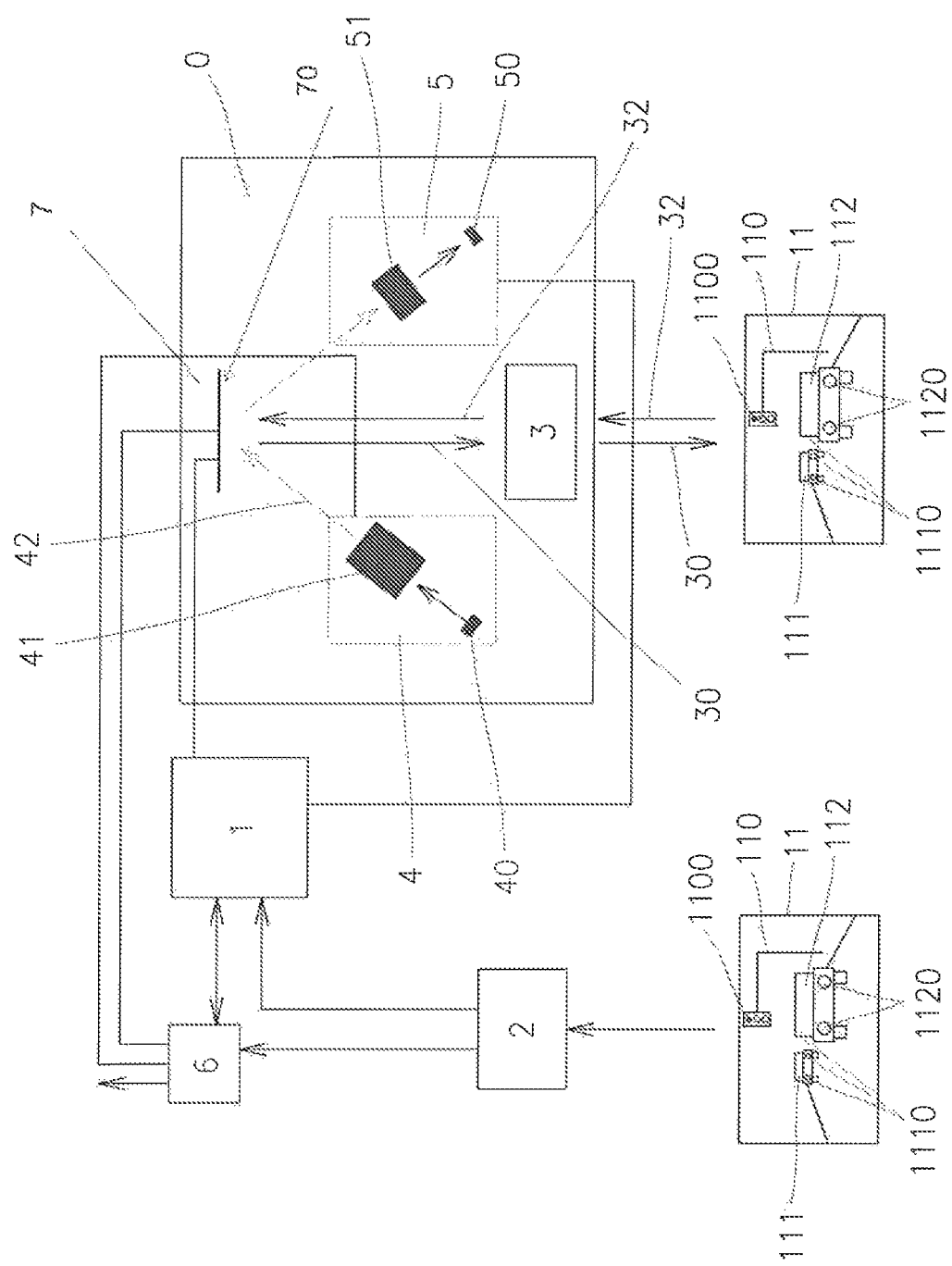
FIG. 1 shows a basic block diagram of the architecture of the communication device of a motor vehicle according to the invention and FIGS. 2 to 5 show various examples of implementation and utilization of the solution according to the invention in a vehicle.

The invention will be described with reference to an exemplary embodiment of a communication device of a motor vehicle and its implementation in a vehicle.

The communication device of a vehicle according to the invention comprises at least one imaging camera 2 of a scene image 11, e.g., an imaging camera for sensing a scene image 11 in the visible spectrum. The imaging camera 2 of the scene image 11 comprises an image sensing chip, sensing optics and electronics to provide the function of sensing the scene image 11.

The imaging camera 2 is either formed by a camera which is connected to vehicle systems 6 and which is provided as part of the vehicle equipment and is intended to sense the vehicle's surroundings and to be used by the ADB/pixel (adaptive driving beam with pixel light source) system of the vehicle, or the imaging camera 2 is formed by a proprietary camera intended for use only in connection with the present invention and disposed at a suitable location of the vehicle and connected to control electronics 1 of the system according to the invention, or the imaging camera 2 is common both to the vehicle systems 6 and to the system according of the invention. In another unillustrated exemplary embodiment, the imaging camera 2 is formed by a camera for monitoring the so-called vehicle driver's blind spot.

The communication device of a vehicle further comprises at least one lighting device 0 which consists, e.g., of headlights and/or rear lights of the vehicle, etc.

The lighting device 0 comprises a digital micromirror device 7, hereinafter referred to only as a DMD 7, which is well-known in the art, e.g., from the technology of DLP projectors, etc. The DMD 7 is coupled to the vehicle systems 6 which control the operation of the lighting device 0, e.g., daytime running lights, low-beam headlights, directional signals, brake lights, rear low-beam lights, etc. The DMD 7 is further coupled to the control electronics 1 of the system according to the invention.

The lighting device 0 further comprises an illumination unit 4 which is functionally arranged towards the mirror surface 70 of the DMD 7 and which is adapted to illuminate the mirror surface 70 of the DMD 7 by a beam 42 of light which is reflected off the mirror surface 70 through the lighting and imaging optics 3 in the form of the desired light output beam 30 from the lighting device 0, i.e. to fulfill the primary function of the lighting device 0. In an unillustrated exemplary embodiment, the illumination unit 4 is adapted to independently illuminate, e.g., only the upper half of the mirror surface 70 of the DMD 7 and to independently illuminate only the lower half of the mirror surface 70 DMD 7 etc., which allows further utilization of the device according to the invention, etc. The illumination unit 4 comprises an illumination source 40, e.g. an LED or a laser diode or a set of diodes, e.g. in a matrix arrangement, and further it includes illumination optics 41, which is arranged between the illumination source 40 and the mirror surface 70 of the DMD 7 and is adapted to transmit light between the illumination source 40 and the mirror surface 70 of the DMD 7. The illumination unit 4 is coupled to the vehicle systems 6 which control its operation.

Further, the mirror surface 70 of the DMD 7 of the lighting device 0 is associated with a secondary imaging unit 5 which comprises an optical sensor 50, e.g. a phototransistor, and an optical member 51 or an optical system arranged between the optical sensor 50 and the mirror surface 70 of the DMD 7. In an exemplary embodiment shown in FIG. 1, the secondary imaging unit 5 is embedded directly into the structure of the lighting device 0. In an unillustrated exemplary embodiment, the secondary imaging unit 5 is disposed outside the actual structure of the lighting device 0 and is functionally associated, e.g. by an optical fiber, with the mirror surface 70 of the DMD 7 to receive a secondary image reflected by the selected mirrors of the mirror surface 70 of the DMD 7 after setting these selected mirrors of the mirror surface 70 of the DMD 7 corresponding to the identified position of the sources of the car2car or car2X signal in the scene image which falls on these selected mirrors of the mirror surface 70 of the DMD 7 in the form of the secondary light 32 through the illumination and imaging optics 3 from the scene image 11, as will be described in more detail below.

The above-described control electronics 1 of the system according to the invention is in the example of FIG. 1 formed by a separate means coupled to the vehicle systems 6. In another exemplary embodiment, the control electronics 1 of the system according to the invention is formed by software blocks in the vehicle systems 6, or the control electronics 1 of the system according to the invention is partially formed by a separate means coupled to the vehicle systems 6 and partially consists of software blocks in the vehicle systems 6.

The scene image 11 in an embodiment shown contains an image of the infrastructure 110, for example, an image of a semaphore light transmitting a car2X signal via at least one of its lights 1100, e.g., about the duration of each of the semaphore colors. The scene image 11 in the illustrated embodiment contains an image of an oncoming vehicle 111 transmitting the first car2car signal via its front lighting device 1110. The scene image 11 in the illustrated embodiment further contains an image of a vehicle moving in the same direction 112 transmitting the second car2car signal via its rear lighting devices 1120. The Car2car signals are typically signals containing information about the traffic situation, traffic density, traffic collapse, surrounding vehicles condition, panic braking, etc.

Figure 2:
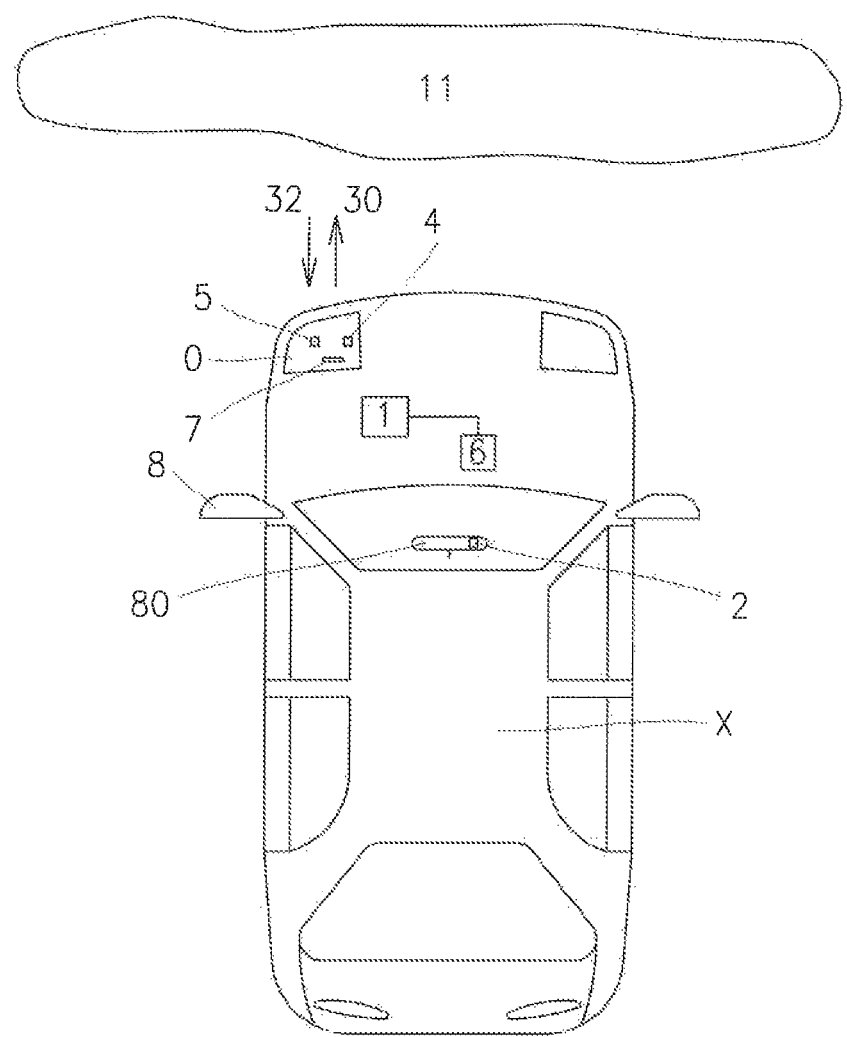

In an exemplary embodiment in FIG. 2, there is a plan view of an example of a vehicle X equipped with the device according to the invention. One headlight of the vehicle X consists of a lighting device 0 with a DMD 7, an illumination unit 4 and a secondary imaging unit 5. An imaging camera 2 is disposed in the vehicle interior rear-view mirror 80 and is adapted to sense the space in front of the vehicle, as is usual at a certain viewing angle with respect to the longitudinal axis of the vehicle X. The vehicle X is further equipped with the control electronics 1 of the system according to the invention, which is connected to the vehicle systems 6, whereby in this exemplary embodiment, the links between the individual elements are not indicated for the sake of clarity and simplicity.

Figure 3:
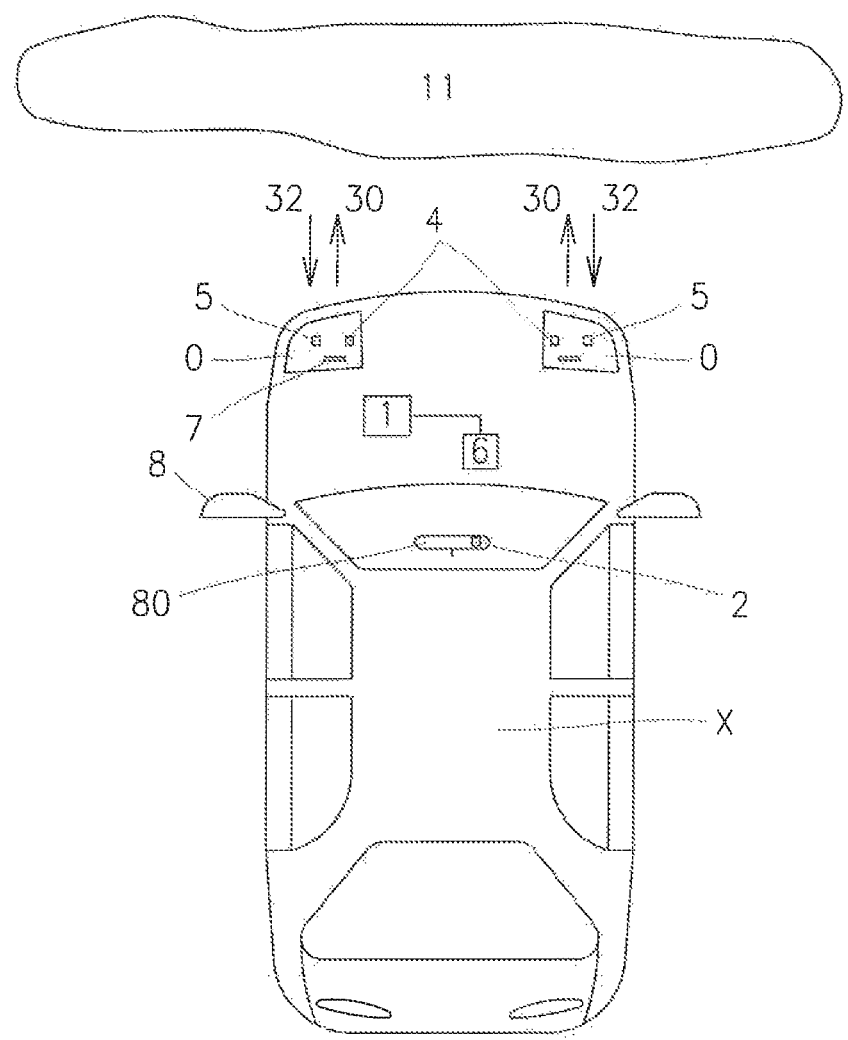

In an exemplary embodiment in FIG. 3, there is a plan view of an example of a vehicle X equipped with the device according to the invention. The two headlights of the vehicle X are formed by a lighting device 0 with a DMD, an illumination unit 4 and a secondary imaging unit 5. An imaging camera 2 is disposed in the interior rear-view mirror 80 of the vehicle and is adapted to sense the space in front of the vehicle, as is usual at a certain viewing angle with respect to the longitudinal axis of the vehicle X. The vehicle X is further equipped with the control electronics 1 of the system according to the invention, which is connected to the vehicle systems 6, whereby in this exemplary embodiment the links between the individual elements are not indicated for the sake of clarity and simplicity.

Figure 4:
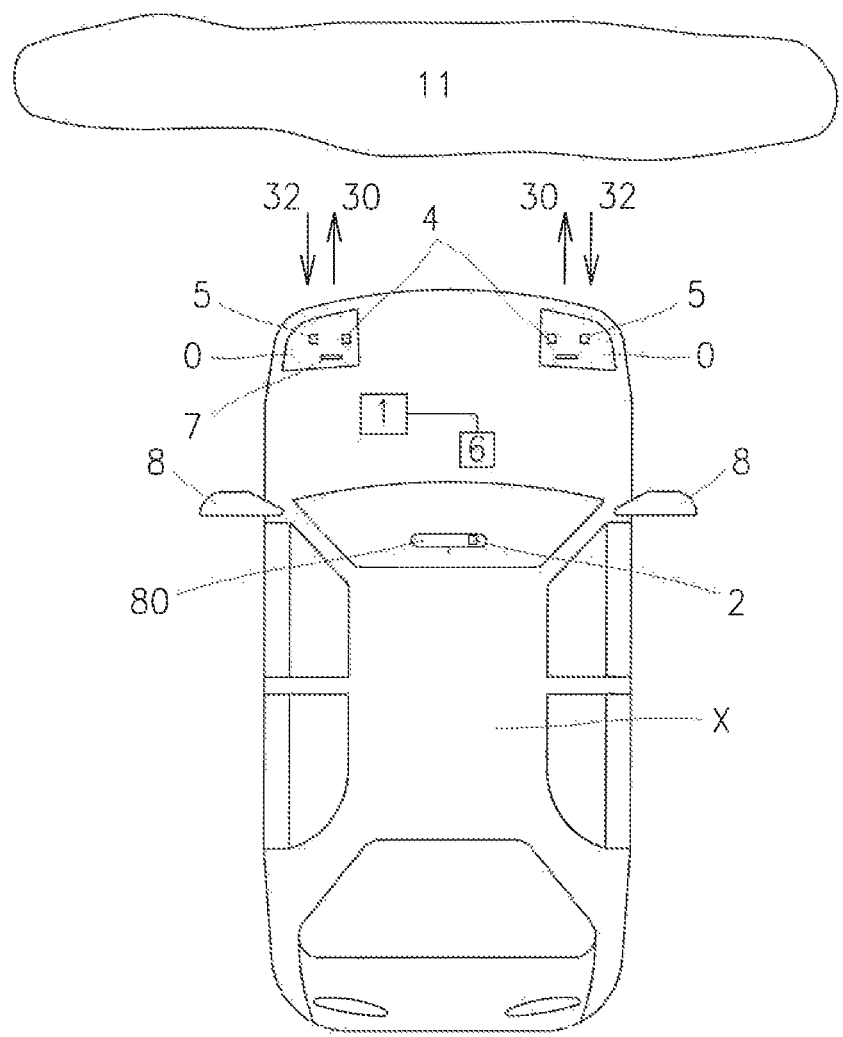

In an exemplary embodiment in FIG. 4, there is a plan view of an example of a vehicle X equipped with the device according to the invention. The two headlights of the vehicle X consist of a lighting device 0 with a DMD 7, an illumination unit 4 and a secondary imaging unit 5. An imaging camera 2 is disposed in the interior rear-view mirror 80 of the vehicle and is adapted to sense the space in front of the vehicle, as is usual at a certain viewing angle with respect to the longitudinal axis of the vehicle X. The vehicle X is further equipped with the control electronics 1 of the system according to the invention, which is connected to the vehicle systems 6, whereby the links between the individual elements in this exemplary embodiment are not indicated for the sake of clarity and simplicity.

Figure 5:
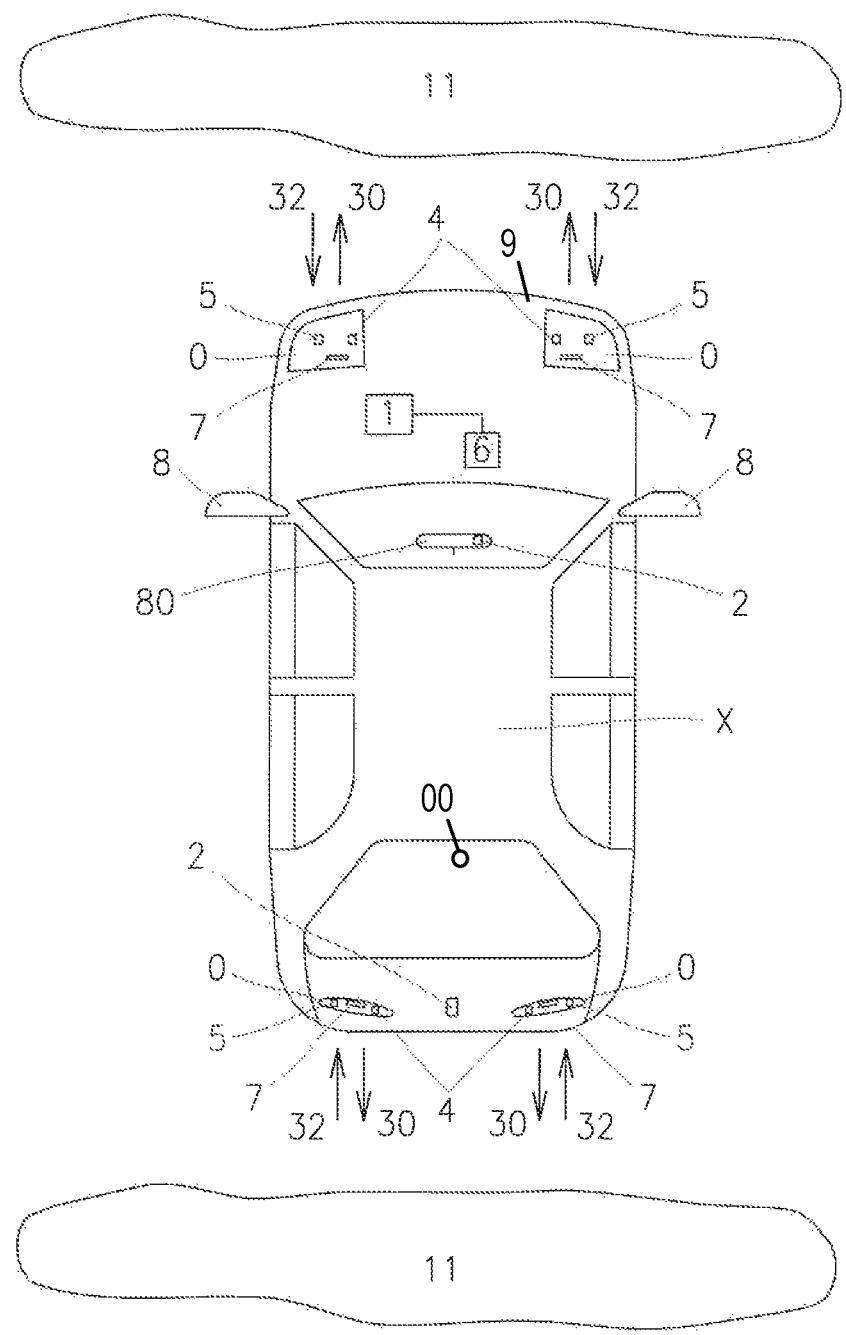

In an exemplary embodiment in FIG. 5, there is a plan view of an example of a vehicle X equipped with the device according to the invention. Both headlights of the vehicle X are formed by a lighting device 0 with a DMD 7, an illumination unit 4 and a secondary imaging unit 5. An imaging camera 2 is disposed in the vehicle interior rear-view mirror 80 and is adapted to sense the space in front of the vehicle, as is usual at a certain viewing angle with respect to the longitudinal axis of the vehicle X. The vehicle X is in its rear part further provided with at least one illumination device 0 with a DMD 7, an illumination unit 4 and a secondary imaging unit 5, whereby in its rear part, it is further provided with at least one imaging camera 2. The imaging cameras 2 are adapted to sense the space in front and behind the vehicle, and as is usual at a certain viewing angle with respect to the longitudinal axis of the vehicle X. The vehicle X is further equipped with the control electronics 1 of the system according to the invention, which is connected to the vehicle systems 6, whereby in this exemplary embodiment the links between the individual elements are not indicated for the sake of clarity and simplicity.

In an unillustrated exemplary embodiment, at least one imaging camera 2 is disposed in the front mask (fascia) 9 of the vehicle X or behind the front mask 9 of the vehicle X and/or in at least one exterior rear-view mirror 8 of the vehicle X and/or in the third, middle upper, brake light 00 of the vehicle X, etc. (see FIG. 5).

In an unillustrated exemplary embodiment, the control electronics 1 of the system according to the invention is formed by the vehicle systems 6, etc.

In another unillustrated exemplary embodiment, the secondary imaging unit 5 is common to at least two lighting devices 0, to which this common secondary imaging unit 5 is coupled, e.g., by means of an optical fibre, etc.

The device according to the invention operates in such a manner that the lighting device 0 with the DMD 7 and the illumination unit 4 operates in its standard manner, i.e. according to the current situation or according to the driver's requirements, illuminating a determined desired area by the light beam 30, e.g., as the main headlights of the vehicle, or daytime running lights, or as main-beam headlamps etc. Simultaneously, the imaging camera 2 senses the scene image 11 and sends it to the control electronics 1, which processes the captured scene image 11 and analyzes areas of the scene image 11 in which objects transmitting useful information in the form of a light Car2car and/or car2X signal can be located or in which they are located. These areas of the scene image 11 containing important information are identified as areas assigned to the position of specific sensing elements (pixels) of the sensing chip 2 of the imaging camera 2, e.g., a CCD or CMOS sensing chip, etc. Subsequently, the control electronics 1 recalculates the positions of these individual sensing elements (pixels) of the sensing chip of the imaging camera 2 into the positions of the individual mirrors within the mirror surface 70 of the DMD 7 and issues an order to redirect only that limited number of individual mirrors of the mirror surface 70 DMD 7 so that, the image which falls on these selected individual mirrors of the mirror surface 70 through the illumination and imaging optics 3 as a light beam 32 from the scene image 11, is reflected from the identified scene image 11 containing important information to the optical sensor 50, for example to a phototransistor. The other mirrors of the mirror surface 70 DMD 7 continue in fulfilling their primary function which consists in emitting the light beam 30 in the desired direction. From the captured reflection of the selected parts of the scene image 11, said optical sensor 50 generates an electrical signal which is passed to the control electronics 1 for the processing and decoding of the transmitted Car2car and/or car2X signal. The decoded Car2car and/or car2X signals are continuously and/or intermittently passed to the vehicle systems 6 which further treat them according to their settings, e.g., an alert for the driver is displayed on a display inside the vehicle, or a protective maneuver is initiated (braking, speed reduction, dodging, stopping and the like), etc. The control electronics 1 can also process other information from the scene image 11 without car2car or car2X signal content, e.g. information about the type of object from which a specific car2car or car2X signal is transmitted (e.g. vehicle in the same lane, vehicle in adjacent lane (left, right), traffic lights, distance of vehicle in front, instantaneous speed of other vehicles, etc.). Obviously, the illumination unit 4 operates only when it is necessary for the illumination unit 4 to fulfill its primary function.

In an unillustrated exemplary embodiment, the vehicle X is equipped not only with a lighting device 0 with an integrated DMD 7, but also with a proprietary system with its own DMD 7 and other elements needed for the detection and decoding of Car2Car and/or Car2X signals.

LIST OF REFERENCES 0 lighting device
1 control electronics
2 imaging camera
3 imaging optics
30 desired light output beam from lighting device
32 light from scene image
4 illumination unit
40 illumination source
41 illumination optics
5 secondary imaging unit
50 optical sensor
51 optical member
6 vehicle system
7 DMD 70 mirror surface
8 exterior rear-view mirror of vehicle
80 interior rear-view mirror of vehicle
11 scene image
110 infrastructure
1100 semaphore light
111 oncoming vehicle
1110 front lighting device
112 vehicle moving in the same direction
1120 rear lighting device

The invention claimed is:

1. A communication device of a motor vehicle comprising:
   control electronics;
   an imaging camera for sensing a scene image and connected to the control electronics;
   a vehicle lighting device for emitting a desired light output beam with an illumination unit, a DMD, and imaging optics;
   the DMD having a mirror surface including a plurality of mirrors;
   the illumination unit being within the lighting device and directed towards the mirror surface of the DMD, the illumination unit being adapted to illuminate controllably at least a part of the mirror surface of the DMD so that the lighting device emits the desired light output beam through the imaging optics;
   the DMD being connected to the control electronics;
   the mirror surface being further functionally associated with an imaging unit;
   the imaging unit having an optical sensor adapted to receive a selected part of light from the scene image through the imaging optics and reflected by a selected part of the mirrors of the mirror surface; and
   the control electronics being adapted to redirect to the optical sensor of the imaging unit only a limited number of mirrors of the mirror surface of the DMD to thereby reflect an image falling on the limited number of mirrors through the imaging optics as a light beam from the scene image of the imaging camera identified as containing important information, the electronics being further adapted to allow other mirrors of the mirror surface of the DMD to continue to reflect light emitted by the illumination unit through the imaging optics as the desired output beam.

2. The communication device of a motor vehicle according to claim 1, wherein the lighting device includes at least one headlight of the motor vehicle.

3. The communication device of a motor vehicle according to claim 1, wherein the lighting device includes at least one rear light of the motor vehicle.

4. The communication device of a motor vehicle according to claim 1, wherein the imaging camera includes a camera for an ADB/pixel system of the motor vehicle.

5. The communication device of a motor vehicle according to claim 1, wherein the imaging camera includes a dedicated imaging camera.

6. The communication device of a motor vehicle according to claim 1, wherein the imaging camera includes a camera mounted for monitoring a blind spot of a driver of the motor vehicle.

7. The communication device of a motor vehicle according to claim 1, wherein the imaging camera is disposed in an interior rear-view mirror of the motor vehicle.

8. The communication device of a motor vehicle according to claim 1, wherein the imaging camera is disposed in at least one side mirror of the motor vehicle.

9. The communication device of a motor vehicle according to claim 1, wherein the imaging camera is disposed in a front mask of the motor vehicle.

10. The communication device of a motor vehicle according to claim 1, wherein the imaging camera is disposed behind a front mask of the motor vehicle.

11. The communication device of a motor vehicle according to claim 1, wherein the imaging camera is disposed in a third brake lamp of the motor vehicle.

12. The communication device of a motor vehicle according to claim 1, wherein the imaging unit is mounted in the lighting device.

13. The communication device of a motor vehicle according to claim 1, wherein the imaging unit is mounted in a structure of the motor vehicle outside the vehicle lighting device, the imaging unit being functionally coupled to the mirror surface.

14. A lighting device of a motor vehicle for a communication device of a motor vehicle, the lighting device comprising:
   a DMD having a mirror surface including a plurality of mirrors, the mirror surface being functionally associated with an illumination unit and output electronics for creating a desired light output beam, the mirror surface being functionally associated with an imaging unit, the mirror surface being functionally associated with electronics for selecting individual mirrors from the mirror surface corresponding to an identified position of sources of a car2car or car2x signal in a scene image, the imaging unit including an optical sensor adapted to receive light from the scene image reflected by the individual mirrors of the mirror surface, the imaging unit being functionally associated with electronics for evaluation of the car2car or car2x signal in the scene image.

15. The lighting device of a motor vehicle according to claim 14, wherein the imaging unit is part of a structure of the lighting device.

16. The lighting device of a motor vehicle according to claim 14, wherein the mirror surface is functionally associated with a transmission element of the selected part of light from the scene image reflected by the selected individual mirrors of the mirror surface, wherein the imaging unit is arranged outside of a structure of the lighting device and is coupled to the transmission element to receive a secondary image from the imaging unit.

* * * * *